April 17, 1951 W. M. SIESEL 2,549,393
FASTENING
Filed March 23, 1945 3 Sheets-Sheet 1
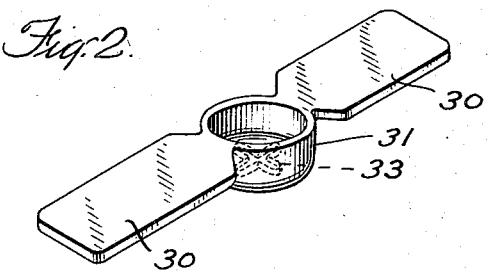
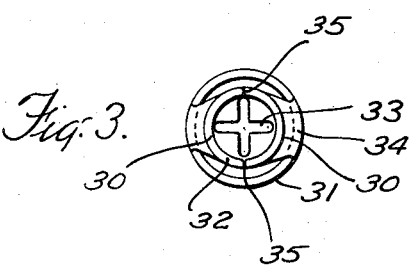
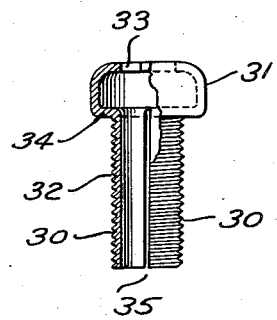
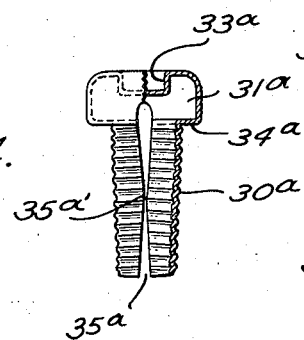
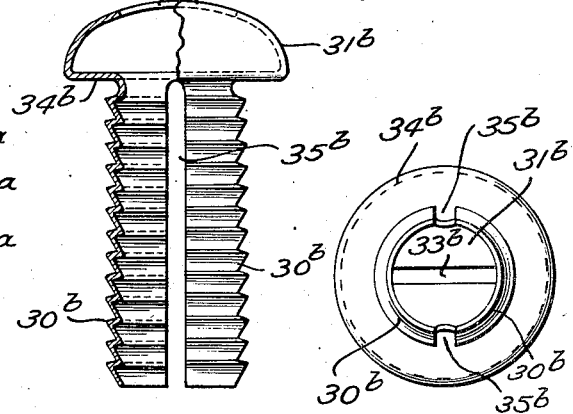
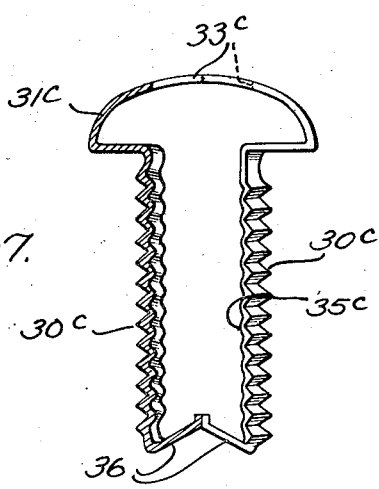
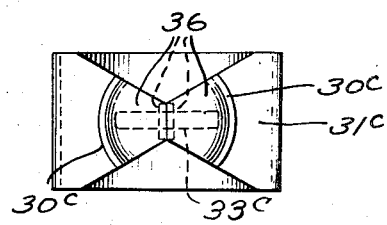
INVENTOR
WILLIAM M. SIESEL
BY
ATTORNEYS April 17, 1951 W. M. SIESEL 2,549,393
FASTENING
Filed March 23, 1945 3 Sheets-Sheet 2

INVENTOR
WILLIAM M. SIESEL
BY
Blair, Curtis & Hayward
ATTORNEYS

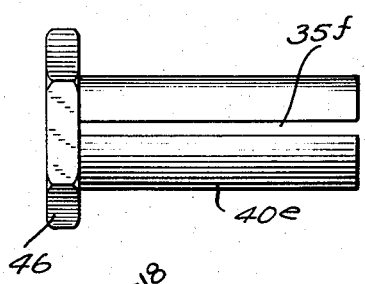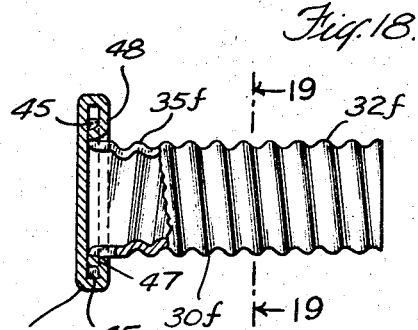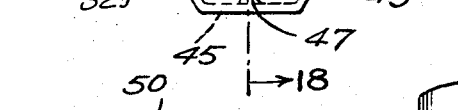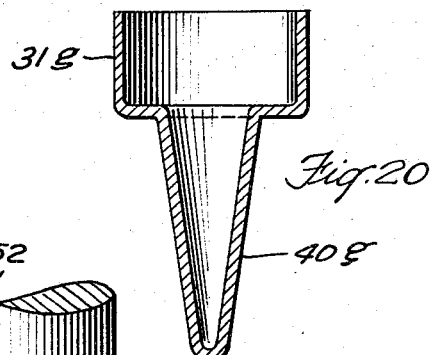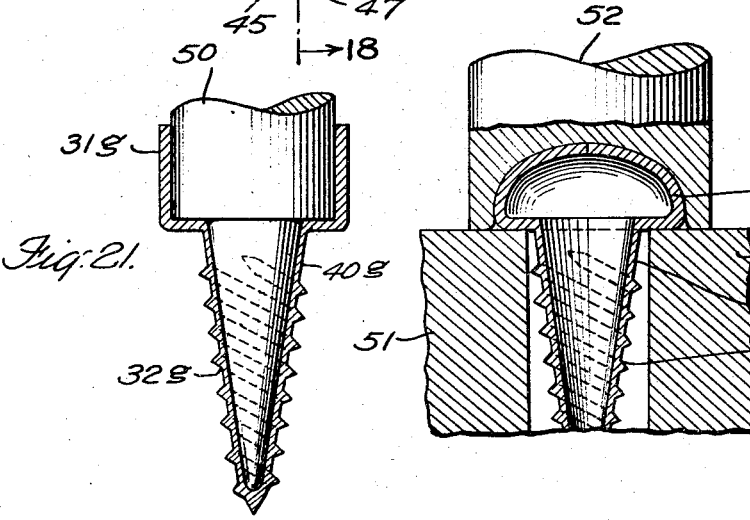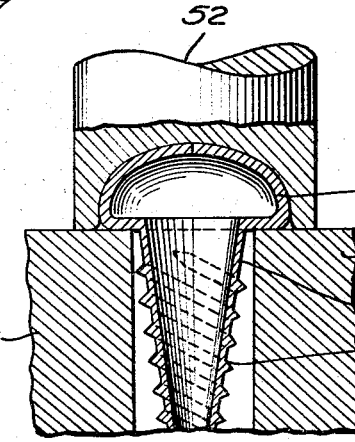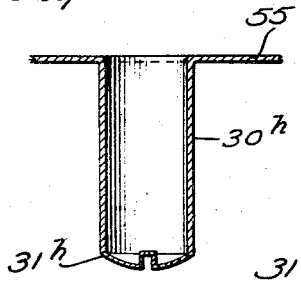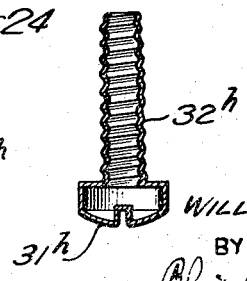

Patented Apr. 17, 1951

2,549,393

UNITED STATES PATENT OFFICE 2,549,393

FASTENING

William M. Siesel, Morrisville, Pa.; Josephine M. Siesel executrix of said William M. Siesel, deceased Application March 23, 1945, Serial No. 584,370

3 Claims. (Cl. 85—1)

This invention relates to screws, bolts and the like.

A general object of the invention is to provide an improved screw, etc., of high strength and especially high resistance to shear and to stripping of threads. Another object of the invention is to provide such a screw which is constructed so that it can readily be inserted and readily removed and yet will not itself work loose. A particular object of the invention is to provide a sheet metal screw having the foregoing characteristics which can be easily and inexpensively manufactured, a further aim of the invention being an economical and efficient process of manufacturing sheet metal screws.

In certain embodiments of my invention an important feature is the provision, in a sheet metal screw of a slit shank of diameter slightly greater than the threaded hole in which it is to be inserted, whereby the resiliency of the metal holds the threads in effective non-rattling engagement. A further feature in a preferred embodiment of the invention is the proportioning of the slit in at least a part of the shank so that it is substantially equal to, or even very slightly less than, an excess circumference of the shank beyond that of the hole in which it is to fit, so that when the bolt or screw is inserted into the hole the edges of the shank close together so as to give in effect a solid shank portion without clearance but resistant to further distortion. Another feature of my invention in certain embodiments is the providing of ears, especially inturned edges, on the two sides of the slit in the shank, one of which ears serves to facilitate the insertion of the screw into the work and the other of which serves to facilitate its withdrawal. Another inventive feature is the provision on the leading edge of the threaded shank, that is, where it is interrupted at the slit, of a sharp, relatively hard thread cutting edge adapted for cutting a female thread when the screw is turned into an untapped hole. Still another important feature is the provision, on the trailing edge of the threaded slit shank of a sheet metal screw of a sharp corner or barb which serves to lock the screw in the female thread of the screw opening against removal except by special means. A further feature of the invention is the special construction by which removal of a screw having such a self-locking barb thereon is facilitated.

Other objects and important features of the invention, to which reference has not specifically been made hereinabove, will be apparent when the following description and claims are considered in connection with the accompanying drawings.

In the drawings and in the following description I have set forth and described a preferred embodiment of my invention and various modifications thereof. These are not intended to be exhaustive nor limiting of my invention; on the contrary, they are selected and described with a view to explaining the principles of my invention and the manner of their application in practical use, and of instructing others skilled in the art so that they may be enabled to apply these principles and to utilize the invention in numerous embodiments with numerous modifications each as may be best adapted to conditions of a particular use.

Figure 1 is a view partly in axial section and partly in elevation of a screw embodying and made according to my invention;

Figure 2 is a perspective view of a partially formed blank stamped out of sheet metal in the manufacture of the screw of Figure 1 in accordance with the invention;

Figure 3 is an end view of the completed screw taken from the bottom of Figure 1;

Figure 4 is a view similar to Figure 1, but showing a modified type of screw.

Figure 5 is a view similar to that of Figure 1, but showing another modified form of the invention;

Figure 6 is an end view of the screw shown in Figure 5;

Figure 7 is a view partly in section and partly in elevation of another embodiment of my invention;

Figure 8 is an end view of the screw shown in Figure 7;

Figure 17 is a view similar to Figure 16 showing an inner wrenching member suitable for the composite screw of Figure 9, but made by the method illustrated in Figures 13-15;

Figure 18 is a view partly in axial section and partly in elevation of another bolt embodying my invention;

Figure 19 is a phantom view taken on the section line 19—19 in Figure 18;

Figure 9:
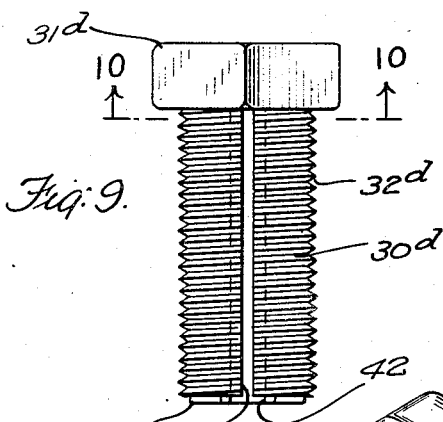
Figure 9 is a view in elevation of another embodiment of the invention.

Figures 20—22 inclusive are views in axial section showing several stages in the formation of a tapered screw by a deep drawing method; and Figures 23-25 inclusive are views in side elevation showing several stages in the formation of a stove bolt by a combination of deep drawing and multiple peening, "multi-swage," spinning or rolling.

Referring first to Figures 1-3, the screw shown there is stamped from sheet metal, advantageously with end portions 30 extending lengthwise of the grain. These ends 30 are adapted to form the shank of the screw and a central portion 31 forms the head. The ends 30 may have embossed or coined thereon oblique ridges and grooves as shown at 32, the angle or pitch being such that, when the ends 30 are brought together as shown in Figure 1, these ridges on both ends approximate a helical thread. The use of the longitudinal grain gives greater strength and greater fatigue resistance, thus permitting the use of relatively thin sheet metal in lieu of heavier tubular or solid bolts. By embossing, or coining, the threads, this longitudinal grain is substantially maintained, and thus serious reduction of fatigue resistance is avoided. The threads may be formed by rolling, but it is a difficult operation; and the thread may be cut, but that is difficult because of the break in circumferential continuity, and is further undesirable because by scoring the surface it reduces fatigue resistance.

The blank is then stamped out and the ends 30, before, during or after the forming of the threads, are bent, e. g. by rolling or stamping, to a substantially semicylindrical form, advantageously in the final forming operation, the ends 30 being brought together, e. g. in a split ring die closed onto an arbor. At this operation also the lower part of the head is formed to give a true bearing surface at 34.

As shown, the central portion 31 is first formed to a cup by a drawing operation and the internal wrenching surfaces are formed at the center of the head portion 31 by punching out an X-hole 33, shaped to receive a so-called "Phillips" screwdriver.

The threaded ends, in their relaxed condition as shown in Figure 1, are advantageously separated by a narrow space 35 and as thus separated have a diameter slightly greater than the female thread in which they are to be received. This difference, however, is not more than the spacing at 35. Likewise, the radius of curvature of the ends 30 may be slightly greater than that of the female thread. By this means, the ends are resiliently compressed when inserted into a female thread and thus hold securely even under conditions of severe vibration. Advantageously, however, the very end, where the screw first engages a female thread, is slightly smaller in these dimensions to facilitate entry and engagement.

In Figure 4 is shown a modified screw similar in many respects to that of Figure 1. In this case, the wrenching surfaces, instead of being formed by punching out a screw driver opening 33, are formed by the walls of a drawn recess 33a, in this case shown in the form familiar in the "Clutch Head" screw. In this case also the edges of the end portions 30a are somewhat rounded and the shank as a whole is tapered. When the shank is formed by bringing the formed end portions 30a together, the edges are substantially touching at the widest portion below the highest threads which are to engage in a female thread. The outer end is of somewhat less diameter than the female thread while the uppermost threaded portion, near the head 34a is substantially wider than the female thread.

When this screw of Figure 4 is to be inserted into a female thread, it is not necessary to "start" the threads in the usual way, but merely to push the screw axially into the opening. Because of the lessened diameter of the outer end and/or the wider spacing at 35a, the male and female threads cam easily over each other. As the screw moves into the opening, however, more force will be required for such camming as the distance from the touching area 35a' is lessened; and soon a point is reached at which the threads no longer slip over one another. As the threads at this point are already engaged and in registry, it is a simple matter to insert a screw driver or other appropriate wrenching tool and turn the screw down farther into the threaded opening.

As the uppermost (widest) threaded portion is turned into the opening, its compression to a lesser diameter can only be accommodated by a rocking of the end portions 30 on each other at the touching areas 35a', and this forces the outer ends out to a wider diameter, thus assuring a tight engagement of the threads throughout the shank.

Figures 5-8 show other embodiments of the invention which are likewise designed for direct engagement without turning, except for the final tightening. In these the spacings 35b and 35c are great enough to accommodate the camming of the male and female threads over each other. In these, however, there is no positive locking such as is achieved by the touching area 35a' described above, but engagement is maintained by resilient force of the screw.

In Figures 5 and 6, it will be noted that the wall thickness of the shank increases as the head is approached and thus the outer end bends more easily than the portions closer to the head. In this case also it will be noted that the slope of the sides of the threads toward the outer end is easy, whereas the opposite sides are abrupt, approximately normal to the axis. Thus, the screw can be readily inserted into a corresponding female thread but it cannot be pulled out by camming the ends 30b—30b together.

The screw shown in Figures 7 and 8 is made with a narrower, more easily formed head 31c and because of this the portions 30c—30c can more readily be sprung toward one another. In order to counteract this and to reinforce the threaded ends in their engagement, the ends are turned inward at 36, and pressing against each other, hold the threaded portions 30c—30c apart. In this case a simple rectangular slot arranged parallel to the head 31 is used for engaging an old-fashioned screw-driver.

In Figures 4-7 the thread is formed by rolling with threaded rolls or otherwise bending the sheet metal into the corrugated form instead of embossing or coining the thread into the surface. This formation of the thread is best made by rolling the thread into the shank after the screw is otherwise formed.

Figure 10:
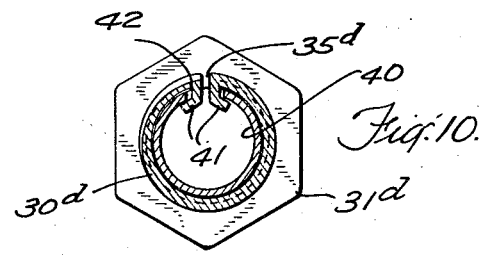
Figure 10 is a cross section taken on line 10—10 of Figure 9.
Figure 11:
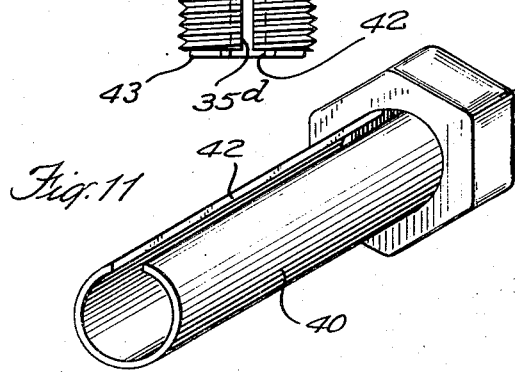
Figure 11 is a perspective view of the inner wrenching member of the screw shown in Figures 9 and 10.
Figure 12:
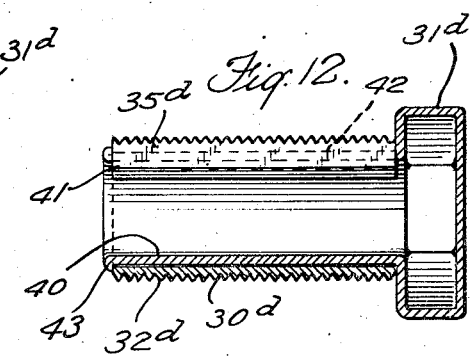
Figure 12 is a view in axial section taken vertically through the center of Figure 10.
Figure 13:
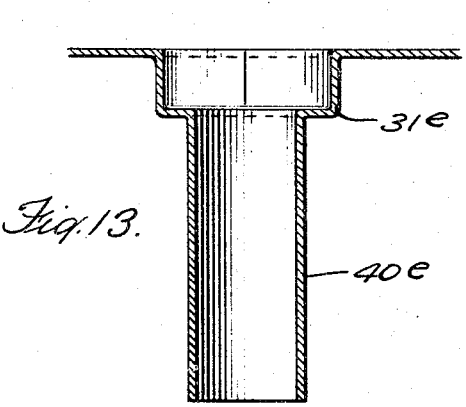
Figure 13 is a view in elevation of a deep drawn blank.

The bolt shown in Figures 9-11 is a composite of a threaded sleeve 30d and a wrenching bolt having a slotted shank 40 and a wrenching head 31d. The sleeve 30d is made by rolling to cylindrical form a strip of metal, turning its ends inward as at 41, and rolling a helical thread as shown. These inturned edges are then received in the slot 42 in the shank 40 and the end of the shank is upset at 43 so as to hold the sleeve 30d securely in place. The sleeve 30d is of slightly larger diameter than the female thread which is to engage it, so that when inserted it expands into the female thread and holds secure. During insertion the leading edge 41 is engaged by the adjacent edge of the shank 40 and moved toward the opposite edge 41, thus collapsing the cylinder sufficiently to allow it to turn freely, and upon removal this action is repeated in the opposite direction.

With this arrangement a further and more positive locking of the bolt in the female threads can be attained by forming sharp edges on the ends of the threads 32d at the sides of the gap 35d. When the sleeve is released, these sharp edges dig into the female thread and hold it secure against accidental turning, but when the wrenching bolt is turned the edges of the shank 40 engage the leading edge 41 and draw it inward sufficiently to allow free turning of the sleeve 30d.

It will be observed that, in the composite structure of Figures 9-11, the tensile stress is taken by the straight shank 40, and the threaded sleeve 30d is under compression such that, if there is any yield, the corrugations are compressed and driven tighter into the female thread.

Figure 14:
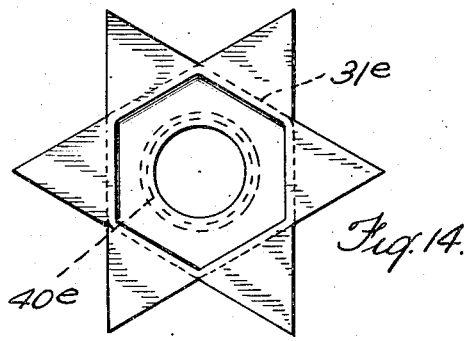
Figure 14 is a top plan view of the blank of Figure 13 after trimming away excess stock.
Figure 15:
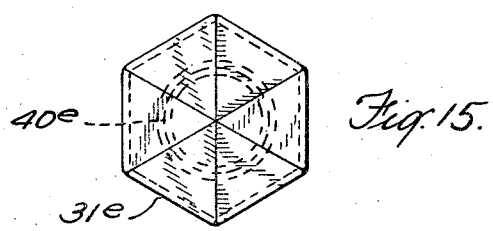
Figure 15 is a view similar to Figure 14 after folding together of portions forming the top of the bolthead.
Figure 16:
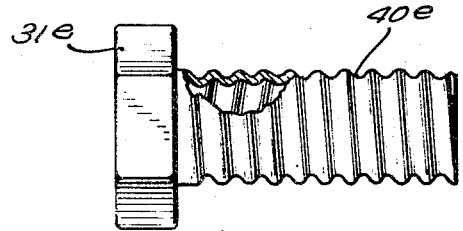
Figure 16 shows in elevation a completed bolt made as illustrated in Figures 13 to 15.

As shown in Figures 9 and 11, the bolt may be made by stamping from sheet metal, first forming a trough-like blank and then closing over the edges to complete the head 31d and make the cylindrical shank 40. Another method of making such a bolt is shown at Figures 13-15 and 17. An intermediate blank is first formed by deep drawing to the shape shown in Figure 13 with the hexagonal head and cylindrical shank. The adjacent flat metal is then cut out in star form as shown in Figure 14 and the points of the star folded back to close the head of the bolt as shown in Figure 15. The cylindrical shank is then slotted longitudinally, as shown in Figure 17, to receive the edge 41 of the sleeve 30d.

Instead of using a separate sleeve 30d, it may sometimes be desirable to form a thread directly on the shank 40. This may be done with the slotted shank, in which case the self-locking feature described above may be attained or the drawn shank 40e may be threaded, e. g. by rolling a thread therein, without slotting.

In Figures 18 and 19 is shown another composite bolt. In this case the shank 30f is formed by rolling up to cylindrical form a sheet metal blank and forming thereon flange teeth 45 and a thread 32f. A hexagonal channel ring 46 surrounds the flange 45 and teeth 47—48 turned upon the under side engage the teeth 45. When the bolt is turned the teeth 47—48 engaging the respective teeth 45 tend to draw together the edges of the shank at the gap 35f and thus to facilitate insertion and removal in a similar way as the wrenching bolt of Figures 9-11.

In Figure 20 is shown a deep drawn blank with conical shank 40g and cylindrical head 31g. In Figure 21 this blank, while supported upon an arbor 50, has the threads 32g rolled into the shank 40g.

In Figure 22, the screw, while supported in a suitable jig or die 51, and after removal of the arbor 50, is acted upon by a series of forming dies of which the final one is shown at 52. By these dies the cylindrical head 31g is worked into dome or other desired form 31g'. Before, during or subsequent to these operations a slot may be formed or cut or other wrenching surfaces suitably formed.

In Figure 23 is shown a deep drawn blank having a head portion 31h and a shank portion 30h drawn from flat stock 55. In Figure 24, the blank has been cut from the stock and the shank portion narrowed, e. g., by a multi-swage process, as on a so-called bead chain apparatus. A thread 32h is then rolled on the shank portion to give a completed stove bolt as shown in Figure 25.

My invention can be applied to screws and bolts of metals, plastics and other materials, to wood screws as well as machine screws, bolts, etc. It is of particular advantage for so-called self-threading screws of the type having hardened threads adapted to cut a thread as they are turned into an unthreaded hole. If the edges of the threads adjacent the gap 35, 35a, etc., are made sharp and hardened, the screws of my invention act like a tap and if the slot 35, 35a, etc., is made reasonably wide, it affords an opportunity for clearing away the chip cut by the sharp edges.

It will be understood that such bolts and screws, studs, etc., can be made according to my invention in an endless variety of forms and by different manufacturing processes of which those mentioned above are only a few examples.

I claim:

1. A screw, bolt or the like which comprises a strip of metal rolled into arcuate form, externally threaded and with its edges adjacent, but spaced from, each other, means for engaging the strip alternatively near either of said edges to rotate the same in the direction of said engaged edge by a force directed along a chord of the circle to which the strip is rolled, whereby to pull said edge inward from a female thread.

2. A screw, bolt or the like as defined in claim 1 wherein the adjacent edges of the rolled strip are turned radially inward, the means for engaging the strip comprise a slotted shank with the ends of said strip engaged in said slot, and a wrenching head attached thereto, the outer end of said shank being upset over the outer end of the rolled strip, whereby said strip is held thereon between the head and said upset end.

3. A screw, bolt or the like as defined in claim 1 wherein the rolled strip is provided with a flanged tooth extending radially outward at one end of each of said edges and a wrenching head embracing the rolled strip at said end and engaging said teeth alternatively in a direction to drive the tooth, and through it the edge attached to it, in the direction of the other.

WILLIAM M. SIESEL.

REFERENCES CITED

The following references are of record in the file of this patent:

UNITED STATES PATENTS

| Number | Name | Date |
|---|---|---|
| 186,503 | Snook | Jan. 23, 1877 |
| 711,653 | Burdick | Oct. 21, 1902 |
| 725,279 | Newton | Apr. 14, 1903 |
| 947,602 | Stahl et al. | Jan. 25, 1910 |
| 1,057,975 | Newhall et al. | Apr. 1, 1913 |
| 1,172,406 | Taylor | Feb. 22, 1916 |
| 1,176,333 | Baker | Mar. 21, 1916 |
| 1,181,971 | Lovell | May 2, 1916 |
| 1,187,714 | Corey | June 20, 1916 |
| 1,470,423 | Brady | Oct. 9, 1923 |
| 1,513,301 | Wahlberg | Oct. 28, 1924 |
| 1,862,486 | Trotter | June 7, 1932 |
| 1,874,595 | Olson | Aug. 30, 1932 |
| 2,145,587 | Draper | Jan. 31, 1939 |
| 2,289,516 | McCullough et al. | July 14, 1942 |